Dec. 2, 1930.    W. C. MacMILLEN    1,783,249
LIQUID OVERFLOW CONTROL MEANS
Filed June 14, 1926
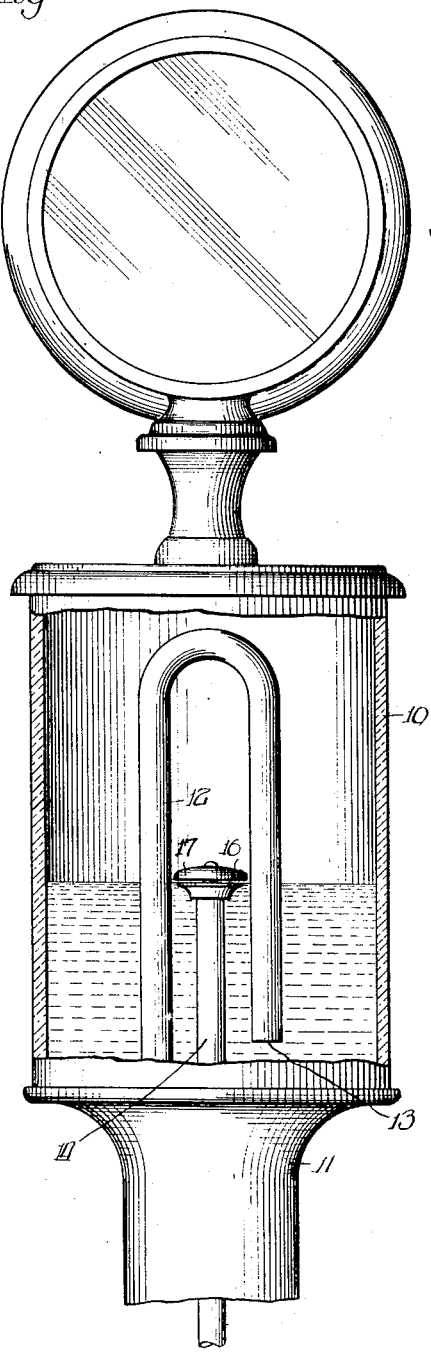
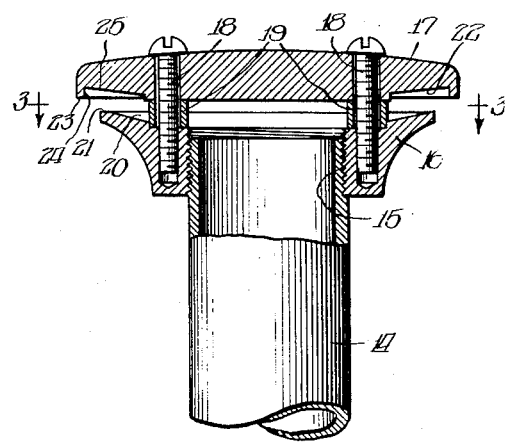
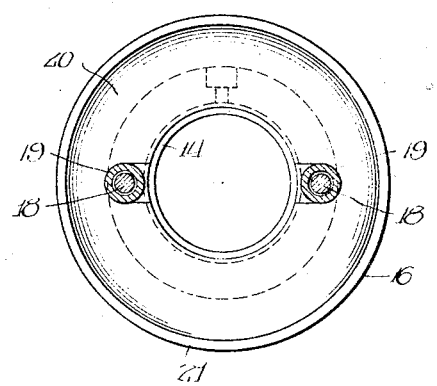
Witness:
G. Burkhardt
Inventor:
William C. MacMillen,
By Wilkinson, Huxley, Byron & Knight
Attys Patented Dec. 2, 1930

1,783,249

UNITED STATES PATENT OFFICE

WILLIAM C. MacMILLEN, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

LIQUID-OVERFLOW-CONTROL MEANS

Application filed June 14, 1926. Serial No. 115,727.

This invention relates to an overflow pipe to be used in liquid measuring chambers and the like, and more particularly to means associated therewith for quickly and accurately establishing the proper liquid level after liquid has been overflowing through the overflow pipe.

When filling a container with liquid to the level of an overflow pipe or stand pipe, variations in the accuracy of the measurement will be found, due to capillary attraction, the liquid adhering to the edge or lip of the overflow pipe or stand pipe and slowly dribbling over, the longer the liquid being allowed to stand the greater the variation.

One object of my invention is to overcome the undesirable capillary attraction above referred to and to establish in place thereof a siphon action or effect upon liquid in the container until the liquid falls to a level at a point below the actual overflow edge of the pipe thereby preventing a further overflow of liquid.

Another object is to provide means in connection with an overflow pipe for quickly and accurately establishing the proper liquid level which will remain constant.

With these and various other objects in view, the invention consists of certain novel features of construction and operation as will be more fully described and particularly pointed out in the specification, drawings and claims appended hereto.

In the drawings, wherein like reference characters are used to designate like parts.

Figure 1 is a fragmentary front elevation, parts being in section, of liquid measuring apparatus embodying my invention;

Figure 2 is a partial vertical sectional view of the overflow pipe embodying my invention; and Figure 3 is a view taken in the plane of line 3—3 of Figure 2.

The various novel features of the invention will be apparent from the following description and drawings and will be particularly pointed out in the appended claims.

Referring to the figures of the drawings, it will be noted that my invention is illustrated in connection with liquid measuring apparatus including a measuring chamber or reservoir 10, preferably of glass and supported upon a suitable pedestal 11. Liquid is supplied to the measuring chamber through any suitable tube which, in this instance, is a U-shaped tube 12, the liquid discharge end 13 thereof being near the bottom of the chamber 10. The measured liquid may be withdrawn in the usual manner through a service connection, not shown. The level of the measured liquid is controlled by an overflow pipe 14 which preferably is vertically slidably mounted and extends into the measuring chamber 10. The upper end of the overflow pipe 14 is provided with means for accomplishing the objects of this invention.

The upper end of the overflow pipe 14 is provided with a threaded portion 15 onto which a lower liquid level controlling member 16 is threaded and preferably secured. The upper liquid level controlling member 17 is secured to the member 16 by any suitable means such as screws 18, there being spacers or collars 19 interposed between the upper and lower members 16 and 17 and preferably surrounding the screws for spacing said members a predetermined distance apart, the thickness of the spacers being determined by the dimensions of the reservoir or measuring chamber. The lower member 16 flares outwardly away from the center of the overflow pipe 14 and has an upper surface 20 which is inclined downwardly toward the middle of the overflow pipe 14. The outer circular periphery of the lower member 16 terminates in what may be called an overflow edge 21, which preferably is a sharp edge. Flare is also provided on the lower lip, as shown in Figure 2, not only to save weight but so as to dispose only a narrow edge at the top or annular edge of the lip. It has been found that with a wide lip the fluid in the reservoir will not flow so well whereas if there is a flare provided there is a more ready flow and a greater tendency to prevent capillary action. The upper member 17 has a lower surface 22 which also is inclined downwardly toward the center of the overflow pipe 14 and is substantially parallel with the cooperating surface 20 on the lower member 16. The cooperating surfaces 20 and 22, among other things, are inclined downwardly toward the center of the overflow pipe 14 to prevent the creation of air pockets which otherwise might have a tendency to block or interfere with the proper overflow of the liquid. A siphon effect is created on the liquid because of the arrangement of the upper and lower members 16 and 17 and their surfaces 20 and 22 respectively, the overflow liquid being attracted to such surfaces thereby creating what may be termed a neutral zone between the upper and lower surfaces 22 and 20 respectively, which not only permits but assists the unrestricted flow between said upper and lower members and down through the overflow of stand pipe 14. The upper member 17 extends outwardly beyond the lower member 16 and terminates in an annular downwardly extending lip 23 for the purpose of maintaining the circular opening between the edges 24 and 21 and the points 25 and 21 substantially the same in order to produce the proper siphon effect. The point 25 referred to is on the lower surface 22 of the upper member 17. The device shown is so designed and constructed as to eliminate, as much as possible, any capillary attraction at the measuring edge 21 of the member 16 by means of the siphon effect referred to. When the liquid has come to the level of the measuring edge 21, the liquid which has been attracted to the upper and lower surfaces 22 and 20 of the members 17 and 16 respectively, releases and runs down the overflow pipe 14, causing the liquid level then to be slightly below the measuring edge 21, this condition being desirable for the liquid then is not held back from further overflow by the capillary action but is below the measuring edge and can be left there indefinitely without changing the measurement.

I have discovered the fact during experimentation that the larger the cross sectional area of the measuring chamber, the closer the top and bottom members 16 and 17 may be arranged because on larger measuring chambers the siphoning effect should be more pronounced to carry away a greater quantity of liquid in a given time. To make this variation in height (or width) of the opening, i. e., the distance determined between the top and bottom members of the fitting, it is only necessary to vary the height of the spacers 19, or add different dimension spacers, or to provide springs between the members expansible when the screws 18 are varied upwardly, or in fact, in any other suitable manner. It will be understood, of course, that the amount of liquid to be measured is controlled by the adjustment of the overflow pipe 14.

It is my intention to cover all modifications of the invention falling within the spirit and scope of the following claims.

I claim:

1. In combination with an overflow pipe, means mounted thereon having spaced cooperating upper and lower surfaces forming a liquid passageway and being inclined downwardly toward the middle of the overflow pipe for creating a siphon effect upon the liquid until such liquid has overflowed to a level slightly below the upper edge of such lower surface, whereupon the siphon effect is overcome and the level of the liquid remains constant.

2. In combination with an overflow pipe, means mounted on said pipe having upper and lower walls spaced apart a uniform amount substantially throughout the length thereof and being inclined downwardly toward the middle of the overflow pipe for creating a siphon effect upon the liquid until the liquid has overflowed to a given level with respect to the upper edge of said lower surface, whereupon the siphon effect is overcome and the level of the liquid remains constant.

3. In combination with an overflow pipe, means mounted thereon including a lower member and an upper member spaced apart to form a liquid passageway, said members being formed whereby the passageway is inclined downwardly toward the middle of the overflow pipe for creating a siphon effect upon the liquid until the liquid has overflowed to a given level with respect to said lower member, the upper member extending outwardly beyond the lower member and having a depending lip to make the effective cross sectional area of the passageway substantially constant to maintain a constant siphon effect while the siphon action is effective, the walls of the members forming the liquid passageway being inclined downwardly to prevent the creation of interfering air pockets.

4. In combination with an overflow pipe, a lower liquid level control member mounted thereon having a measuring edge, an upper liquid level control member mounted on said lower member and spaced therefrom, cooperating surfaces of said members forming a liquid passageway and being inclined downwardly toward the middle of said overflow pipe for preventing the formation of obstructing air pockets and for creating a siphon effect upon the liquid until the liquid has overflowed to a level slightly below the measuring edge of said lower member, whereupon the siphon effect is overcome and the level of the liquid remains constant.

5. In a device of the character described, the combination of a reservoir, an overflow device to regulate the fluid level in said reservoir, said device including a plurality of spaced members having surfaces sloping downwardly and inwardly of said device, one of said surfaces having a lip disposed toward another surface.

6. In a device of the character described, the combination of a reservoir, an overflow device including an overflow pipe, a lip having downwardly and inwardly sloping surfaces, a cap spaced from and secured to said lip having a surface substantially parallel to one of said first named surfaces, and a downwardly directed annular flange on said cap spaced from and above said lip.

7. In a device of the character described, the combination of a member having a surrounding lip, said lip sloping downwardly and inwardly to an opening, a cap for said member adapted to be spaced from and overlie said member, said cap having portions disposed adjacent and substantially parallel to said before mentioned sloping portions of said lip and said cap being provided with a lip approaching said first mentioned lip.

8. In a device of the character described, the combination of a member having a surrounding lip, said lip having a portion thereof sloping downwardly and inwardly to an opening, a cap for said member adapted to be spaced from and overlie said member, said cap having portions disposed adjacent and substantially parallel to said before mentioned sloping portions of said lip, said cap also having a flange disposed toward the first named member.

9. In a device of the character described, the combination of an annular member having a surrounding lip, a portion of said lip sloping downwardly and inwardly toward an opening, another portion thereof being cut away toward the opening, means for fastening said member to a drain, a cap for said member adapted to be spaced from said member and having an annular portion cooperating with said downwardly and inwardly sloping portion of said member, said cap having an annular flange so disposed that the distance between the upper edge of the lip on the inner edge of the flange is equal to the distance between the upper edge of the lip and the portion of the cap directly above said edge.

10. In a device of the character described, the combination of an annular member having a surrounding lip, a portion of said lip sloping downwardly and inwardly toward an opening, another portion thereof being cut away toward the opening, means for fastening said member to an overflow, a cap for said member adapted to be spaced from said member and having an annular portion cooperating with said downwardly and inwardly sloping portion of said member, said cap having an annular flange so disposed that a siphonic effect is produced for a predetermined period.

11. In a liquid dispensing apparatus, the combination of a reservoir, an overflow, an overflow device cooperating with said overflow to regulate the fluid level in said reservoir including means having a plurality of surfaces forming an overflow passage, the width of the entrance of said passage being substantially equal to the distance between said surfaces in order to establish a siphonic effect in regulating the fluid level in said reservoir to a point where said liquid level will be independent of one of said surfaces.

12. A leveling device including spaced members adapted to be disposed one wholly above the other to provide a leveling entrance opening and an overflow passage, the width of said opening being substantially equal to the height of the passage.

13. A leveling fitting including a plurality of spaced members, one of said members having means for attaching said fitting to a conduit, said members having a leveling entrance opening, the width of said opening at an edge of the member having the attaching means being substantially equal to the height of the passage formed in said fitting.

14. A leveling fitting including a plurality of adjustable spaced members, one of said members having means for attaching said fitting to a conduit, said members having a leveling entrance opening, the width of said opening at an edge of the member having the attaching means being substantially equal to the height of the passage formed in said fitting.

15. A leveling fitting including means adapted to be associated with an overflow pipe, a member associated with said means and so formed that the width of a leveling entrance opening is substantially equal to the height taken from an edge of said member to a portion of said means.

16. A leveling fitting including means adapted to be associated with an overflow pipe, said means including a member so formed that a leveling entrance opening is provided, the width of said opening being substantially equal to the height taken from the lower edge of said entrance to the lower surface of said member.

Signed at Rochester, Pennsylvania, this 7 day of June, 1926.

WILLIAM C. MacMILLEN.